(12) United States Patent
Shirai et al.

(10) Patent No.: US 7,956,147 B2
(45) Date of Patent: Jun. 7, 2011

(54) PREPARATION METHOD OF HOLLOW PARTICLE

(75) Inventors: Aya Shirai, Tokyo (JP); Mitsutoshi Nakamura, Tokyo (JP); Tatsuya Nagase, Tokyo (JP); Motoi Nishimura, Tokyo (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 578 days.

(21) Appl. No.: 12/043,305

(22) Filed: Mar. 6, 2008

(65) Prior Publication Data
US 2008/0269447 A1    Oct. 30, 2008

(30) Foreign Application Priority Data

Apr. 24, 2007  (JP) ................. 2007-113917

(51) Int. Cl.
*C08F 12/08* (2006.01)
*C08J 9/16* (2006.01)

(52) U.S. Cl. ............ 526/346; 526/336; 521/64; 521/65; 521/56

(58) Field of Classification Search .................. 526/346, 526/336; 521/64, 65, 56
See application file for complete search history.

(56) References Cited

FOREIGN PATENT DOCUMENTS
JP    2005-200613    *    7/2005
* cited by examiner

*Primary Examiner* — Ling-Siu Choi
(74) *Attorney, Agent, or Firm* — Lucas & Mercanti, LLP

(57) ABSTRACT

Disclosed is a method of preparing hollow particles comprising polymerizing a hydrophobic monomer to form a particulate resin exhibiting a number average molecular weight of from 20,000 to 500,000, dispersing the particulate resin in an aqueous medium to form a resin particle dispersion and adding thereto a hydrophobic cross-linkable monomer in an amount of from 0.1 to 50 parts by mass based on 1 part by mass of the particulate resin to polymerize the cross-linkable monomer to form hollow particles.

14 Claims, 1 Drawing Sheet

PREPARATION METHOD OF HOLLOW PARTICLE

FIELD OF THE INVENTION

The present invention relates to a preparation method of hollow particles.

BACKGROUND OF THE INVENTION

There are known so-called hollow particles with a structure having a void in the interior thereof. Hollow particles have been employed as a functional material through application of their voids. For instance, there are cited a case of utilization as a microcapsule by encapsulating various kinds of material within voids and a case of addition to sheet paper as light-scattering material by employing diffused reflection within the voids. There is also used as a heat insulating material by employment of the insulation effect of the voids.

Such hollow particles were often made, in their early stage, by applying a physical action employing gas, heat or the like to polymeric particles. For instance, a foaming agent or volatile material such as butane is preliminarily included in polymeric particles and allowed to foam or gasify, forming the voids. There was also a technique in which liquid is allowed to permeate into polymeric particles containing an alkaline-swellable material and the contained material is allowed to swell to form voids, as described in JP-A No. 56-32513 (hereinafter, the term JP-A refers to Japanese Patent Application Publication).

These methods of applying a physical action to polymeric particles often resulted in a complex production process or produced problems such that they took some time and effort to make uniform the shape or size of voids. Thereafter, there was discovered a method of polymerizing a polymerizable monomer to form hollow particles. Such a polymerization method produced hollow particle uniform in void form or size and became an effective means for volume production of uniform quality.

There was disclosed, for example, a method in which polymerization was performed in an aqueous medium to form resin particles and concurrently phase separation and polymerization shrinkage were performed in the interior of the formed particles to form voids, as described in JP-A No. 62-127336. There was also disclosed a technique in which polymerization was conducted in stepwise decreased addition of a monomer containing a carboxy group to form hollow particles having a triple-layered structure, as described in JP-A No. 6-248012.

There was also disclosed a method in which a cross-linkable a mixture of a monomer, a polymerization initiator and an organic solvent is dispersed in an aqueous medium and suspension polymerization is performed to form single-layered resin particles encapsulating the organic solvent, followed by removal of the organic solvent by spontaneous vaporization or evacuation to form hollow particles, as described in JP-A No. 2002-80503.

Recently, there are placed expectations of making hollow particles through polymerization methods, as set forth above.

SUMMARY OF THE INVENTION

Recently, however, it was revealed that problems arose with the use of hollow particles prepared by a polymerization method, as microcapsules or a light-scattering material. One of problems is that hollow particles made by using a hydrophilic monomer exhibit a property of the moisture content tending to vary and specifically when used under high temperature and high humidity, the moisture content was not negligible.

Hollow particles prepared by use of a hydrophobic solvent with odor produced problems of odor or bleed-out of the solvent on the particle surface, due to residual solvent, therefore, such hollow particles were unsuitable for the use avoiding odor or volatile material. Further, complete removal of such a solvent requires an excessive drying equipment or drying time, affecting production efficiency or cost.

Conventional preparation methods used a hydrophilic or hydrophobic monomers with odor and were difficult to provide hollow particles exhibiting stable quality. There was also not be provided a preparation method sufficient in production efficiency or cost.

Accordingly, it is an object of the invention to provide hollow particles prepared by a polymerization method which is invariable in moisture content under environmental influence nor causes problems of odor or bleed-out due to residual solvent and a preparation method of the same.

One aspect of the invention is directed to a method of preparing hollow particles comprising polymerizing at least one hydrophobic monomer to form a particulate resin exhibiting a number average molecular weight of from 20,000 to 500,000, dispersing the particulate resin in an aqueous medium to form a resin particle dispersion and adding thereto at least one hydrophobic cross-linkable monomer in an amount of from 0.1 to 50 parts by weight based on 1 part by weight of the particulate resin to polymerize the cross-linkable monomer to form hollow particles.

The preparation method of the invention can provide hollow particles inhibiting variation of moisture content with environmental humidity without causing odor or bleed-out due to residual solvent.

In the invention, hollow particles can be prepared even without use of an organic solvent so that a drying equipment for solvent removal and a drying time, as required in the prior art are not required and no solvent remains in the hollow particles. Further, environmental load due to the preparation process is also reduced.

As a result, it becomes feasible to provide hollow particles usable for high-reliable microcapsules, light-scattering members and heat insulating materials. Specifically, it enables providing hollow particles for the use avoiding variation in moisture content and existence of odor or a volatile material.

DETAILED DESCRIPTION OF THE INVENTION

Figure 1:
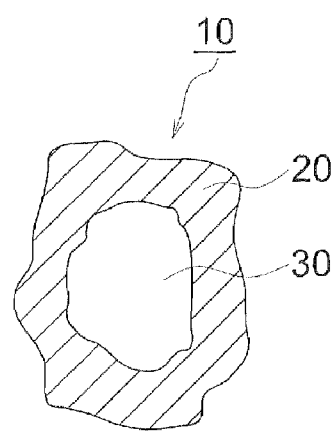
FIG. 1 illustrates a hollow particle.

There have been studied by the inventors of this application hollow particles inhibiting variation of moisture content with environmental humidity without causing odor or bleed-out due to residual solvent and at reduced environmental load of the preparation process.

It was discovered that the foregoing problems were dissolvable of hollow particles prepared by the process of polymerizing a hydrophobic monomer to form resin particles having a number average molecular weight of 20,000 to 500,000, adding and polymerizing a hydrophobic cross-linkable monomer in the presence of the resin particles to form hollow particles.

Thus, particle formation by using a hydrophobic monomer and a hydrophobic cross-linkable monomer has enabled to form hollow particles exhibiting minimized variation in moisture content with environmental effects.

Controlling the amount of a hydrophobic cross-linkable monomer within the range described above enabled to perform efficient void formation. Further in the invention, the use of organic solvents was minimized in the process of preparing hollow particle, so that the prepared hollow particles contained no residual organic solvent within the particles, dissolving the problems such as odor or bleed-out. Further, environmental load of the preparation process was also reduced.

A hollow particle as defined in the invention refers to a resin particle which has an enclosed cavity or space within the particle when sectionally observed by a transmission electron microscope (TEM), that is, a void capable of including gas or liquid.

Electron-microscopic observation of voids can be conducted in the following manner. First, hollow particles are buried in a photo-curable resin and an approximately 100 nm thick ultraslice is prepared by an ultramicrotome and photographed by a transmission electron microscope (2000 FX, produced by Nippon Denshi Co.). Observation of the obtained electron micrograph can confirm the presence/absence of a void within the hollow particle.

The void fraction within a hollow particle can also be determined from electron micrograph images. Image data photographed with a transmission electron microscope are processed by an image processing apparatus (LUZEX F, produced by Nicore Co.) to calculate the area of the resin region of the hollow particle and the area of the void. The void ratio can be determined by assigning these values to the following equation:

$$\text{Void ratio (\%)} = [\text{area of void portion}/(\text{area of resin portion} + \text{area of void portion})] \times 100$$

The foregoing image processing apparatus performs processing to separate a configuration image of a hollow particle to the resin region and the void region, whereby areas of these regions are respectively calculated. Preferably, at least 50 hollow particles are measured to determine the void ratio.

Hollow particles prepared in the method of the invention preferably exhibit a void ratio of 10-70%. The particle size of hollow particles or the void ratio is variable depending on the use thereof, therefore, it is preferred to prepare hollow particles suitable for the use.

Hollow particles prepared in the method of the invention preferably exhibit a volume-based median diameter ($D_{50}$) of 0.06 to 100 µm, which are light-weight, exhibit enhanced covering power, cause no odor and inhibit variation in moisture content with environmental humidity.

Specifically, hollow particles prepared in the method of the invention can be used as a spacer for liquid crystals, white particles, a covering power-providing member (for paint and paper coating), a coating agent for coated paper which is characterized in low gravity and fine particles, light-scattering particles employing the difference in refractive index of internal voids and microcapsules by encapsulating various materials within the voids.

FIG. 1 illustrates a hollow particle, in which numeral 10 designates the hollow particle, numeral 20 designates the resin portion forming the film of the hollow particle and numeral 30 designates the void portion. Thus, the hollow particle (10) of the invention is formed of the resin portion (20) constituting a film of the hollow particle and the void portion (30) formed inside the particle.

The present invention will be further described in detail.

First, there will be described an example of the preferred preparation methods of hollow particles.

Hollow particles are prepared preferably according to the following steps (1)-(3), and optionally, steps (4) and (5) may be provided:

(1) a step of polymerizing at least one hydrophobic monomer to form resin particles having a number average molecular weight of from 20,000 to 500,000, in which polymerization of the hydrophobic monomer is performed in an aqueous medium or an organic solvent (hereinafter, also denoted as organic solvent X) which dissolves the hydrophobic monomer but does not dissolve the formed polymer;

(2) a step of adding, to a dispersion having the resin particles dispersed, 0.1-50 parts by mass of a hydrophobic cross-linkable monomer having at least two ethylenically unsaturated bonds, a polymerization initiator, a dispersion stabilizer and a water-insoluble organic solvent (hereinafter, also denoted as organic solvent Y) in an amount of not more than 1% by mass (more preferably not more than 0.01% by mass), based on the total resin components;

(3) a step of polymerizing the hydrophobic cross-linkable monomer in the dispersion to form hollow particles;

(4) a step of washing the hollow particles formed in step (3) and (5) a step of drying the hollow particles washed in (4).

In the foregoing step (2), when adding the hydrophobic cross-linkable monomer to the resin particles, a hydrophobic monomer may further be added to perform copolymerization with the hydrophobic cross-linkable monomer.

The step of forming a void within the resin particle (namely, the step of forming a hollow particle) is assumed to proceed as follows. First, when adding a hydrophobic cross-linkable monomer and a polymerization initiator to a resin particles having a number average molecular weight of 20,000 to 500,000, the hydrophobic cross-linkable monomer is penetrated into the resin particles. The thus penetrated hydrophobic cross-linkable monomer is initialized to polymerize by the polymerization initiator. Simultaneously with the process of polymerization, the hydrophobic cross-linkable monomer near the resin particle surface performs polymerization to form a polymeric film constituted of the hydrophobic cross-linkable monomer on the surfaces of the resin particles. As polymerization proceeds further, the polymeric film constituted of the hydrophobic cross-linkable monomer begins to separate, resulting in the progress of separation of the film to form a void between the film and the resin particle surface.

It is assumed that an aqueous medium is introduced into the void of the resin particle to obtain a hollow particle dispersed in the aqueous medium.

It is further assumed that polymerization of a hydrophobic cross-linkable monomer on the resin particle surface partially forms strong molecular bonding through a crosslinking structure between the polymer formed of the cross-linkable monomer and the surface of the initially formed resin particle, whereby the film formed on the particle surface is removed from the particles.

On the other hand, a polymer formed of the cross-linkable monomer, which is incompatible with the initially formed polymer, can form a film having a structure which is phase-separated from the initially formed resin.

Thus, it is assumed that while forming a cross-linking structure with the initially formed resin particle surface, film formation by a cross-linkable monomer incompatible with the initially formed resin prepares a hollow particle.

The initially formed resin particles exhibit a number average molecular weight of from 20,000 to 500,000, and preferably from 40,000 to 100,000. When the number average molecular weight of the resin particles falls within the foregoing range, the cross-linkable monomer is absorbed by the resin particles in the initial stage of polymerization to form a cross-linking structure between the cross-linkable monomer and the resin particles. Simultaneously with the progress of polymerization, a polymer formed of the cross-linkable monomer is easily separated from the surface of the resin particles, effectively performing internal void formation.

The number average molecular weight of the resin particles is one determined by the following measurement. Specifically, the number average molecular weight of the resin particles is determined by the gel permeation chromatography (CPC) method with using tetrahydrofuran (THF) as a column solvent. More specifically, 1 ml of THF is added to 1 mg of a measurement sample and stirred by a magnetic stirrer at room temperature to obtain a solution. Subsequently, the obtained solution is filtered with a membrane filter with a pore size of 0.45-0.50 µm and then injected into a GPC. Measurement of GPC is carried out under the condition that the column is stabilized at 40° C., THF is run at a flow rate of 1 ml/min and 100 µl of a sample at a concentration of 1 mg/ml. The combined use of commercially available polystyrene gel columns is preferred as a column. Examples thereof include combinations of Shodex CPC and KF-801, 802, 803, 804, 805, 806, and 806, produced by Showa Denko Co.; combinations of TSK gels G1000H, G2000H, G3000H, G4000H, G5000H, G6000H, G7000H, and TSK guard column, produced by TOSO Co.

A refractive index detector (IR detector) is preferably used as a detector. The molecular weight of a sample is determined using a calibration curve prepared by using standard monodisperse polystyrene particles. Preparation of the calibration curve preferably uses about ten points of the polystyrene.

Hollow particles can be prepared by using an equipment described below.

Figure 2:
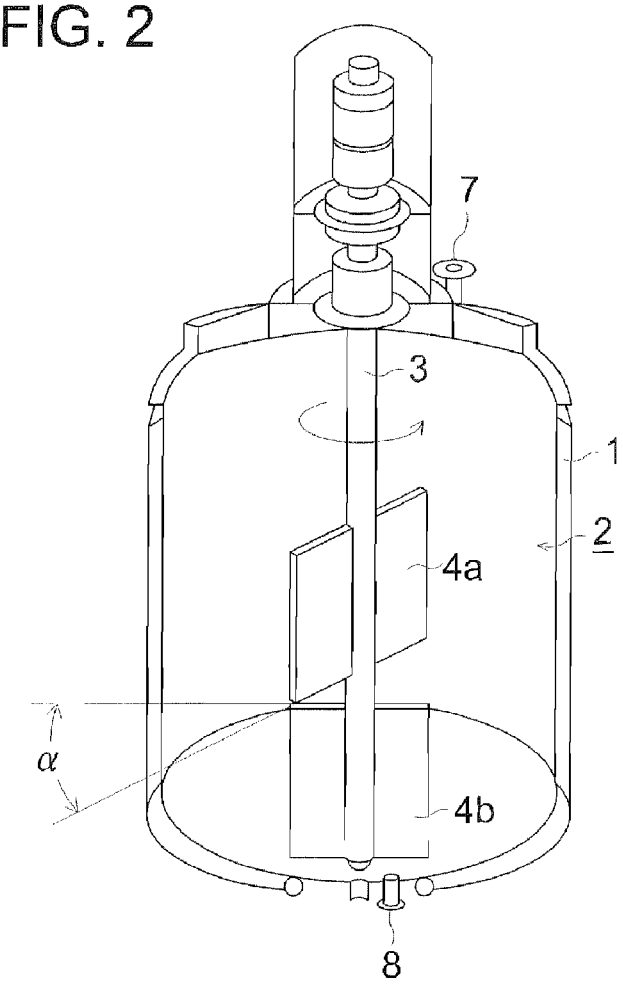
FIG. 2 illustrates an example of a reactor used for preparation of hollow particles.

FIG. 2 illustrates an example of a reactor used for preparation of hollow particles. In FIG. 2, numeral 1 designates a jacket for heat exchange, numeral 2 designates a stirred tank, numeral 3 designates a rotating shaft, numerals 4a and 4b designate a stirring blade, numeral 7 illustrates an upper material charging inlet, numeral 8 designates a lower material charging inlet, and "α" is a crossing angle of the stirring blades.

The reactor shown in FIG. 2 has a feature that stirring blades of multistage constitution are installed, in which the upper stirring blade is provided in advance at a crossing angle of α in the rotational direction to the lower stirring blade and no block such as a baffle, causing a turbulent flow is provided within the stirring vessel.

In the reactor shown in FIG. 2, the rotation shaft 3 is vertically provided at the central portion of vertically cylindrical stirring vessel provided with the jacket for heat exchange 1 on the periphery. The lower stirring blade 4b is positioned close to the bottom of the tank 2 and attached to the shaft 3 and further on the upper side, the upper stirring blade 4a is provided. The upper stirring blade 4a is in advance to the lower stirring blade 4b at a crossing angle of α in the rotational direction. In FIG. 2, the arrow indicates the rotational direction.

In the preparation method of toners of the invention, the crossing angle between stirring blades 4a and 4b is preferably less than 90°. The lower limit of the crossing angle is not specifically limited. A crossing angle of not less than 5° and less than 90° is preferred and a crossing angle of not less than 10° and less than 90° is more preferred.

The form of the stirring blade is not specifically limited, unless a turbulent flow is to be formed therein. A stirring blade formed of the continuous surface having no through-hole, for example, in the form of a rectangular plate shown in FIG. 1, is preferred. The stirring blade may also be formed of a curved surface.

The stirring blade forms no turbulent flow, whereby coalescence of resin particles is caused in the polymerization step and no re-dispersion due to destruction of particles occurs.

Excessive collision of particles is inhibited in the process of polymerizing a hydrophobic cross-linkable monomer and a mono-functional hydrophobic monomer, resulting in enhanced uniformity in particle size distribution and leading to hollow particles of uniform particle size distribution. Further, excessive coalescence of particles is inhibited, whereby hollow particles of a uniform shape can be obtained.

In the washing step, hollow particles are separated through solid/liquid separation from the hollow particle dispersion cooled to room temperature and the separated cake (an aggregate of wetted hollow particles which is aggregated in a cake form) is subjected to a washing treatment to remove attachments such as a dispersion stabilizer from the hollow particles. The filtration treatment is conducted by centrifugal separation, reduced pressure solid/liquid separation using a Nutsche funnel, or solid/liquid separation and washing by using a filter press, but is not specifically limited.

In the drying step of hollow particles, the thus washed cake is subjected to a drying treatment. Drying machines such as a spray dryer, vacuum free-dryer or a reduced pressure drying machine can be employed. It is also preferred to employ a standing plate dryer, a moving plate dryer, a fluidized-bed dryer, rotary dryer and stirring dryer. The moisture content of dried hollow particles is preferably not more than 5% by mass, and more preferably not more than 2% by weight. When dried hollow particles aggregated through a weak attractive force between particles to form a aggregate, the aggregate may be subjected to a disintegration treatment. There are usable mechanical disintegrating apparatuses such as a jet mill, a Henschel mixer, a coffee mill or a food processor.

There will be described materials used for preparation of hollow particles.

In the invention, the hydrophobic monomer refers to a radical-polymerizable monomer that has an ethylenically unsaturated bond in the structure (or molecule) and is constituted of a group in which the group is at least one selected from the group consisting of an alkyl group, an alkyl-substituted aryl group, or a (meth)acrylate substituted by an alkyl group having 6 or more carbon atoms. In the invention, polymerization of such a hydrophobic monomer forms resin particles exhibiting a number average molecular weight of 20,000 to 500,000.

Specific examples of a hydrophobic monomer include styrene, α-methylstyrene, vinyltoluene, lauryl acrylate, lauryl methacrylate, 2-ethylhexyl acrylate, 2-ethylhexyl methacrylate, cyclohexyl acrylate, cyclohexyl methacrylate, benzyl acrylate, benzyl methacrylate, decyl acrylate, decyl methacrylate, palmityl acrylate, palmityl methacrylate, stearyl acrylate, behenyl acrylate, cetyl methacrylate, stearyl methacrylate, isoboronyl methacrylate, butadiene, and isoprene. Of these, styrene is preferred.

In the invention, the hydrophobic cross-linkable monomer refers to a radical-polymerizable monomer that has at least two ethylenically unsaturated bonds in the structure (or molecule) and is constituted of a group in which the group refers to an alkylene group, an alkyl-substituted phenylene group or an alkyl-substituted naphthylene group, or a di-(meth)acrylate substituted by an alkylene group having 6 or more carbon atoms, a tri-(meth)acrylate group substituted by an alkylene group having 6 or more carbon atoms or a tetra-(meth)acrylate group substituted by an alkylene group having 6 or more carbon atoms of 6.

In the invention, a polymer formed of the foregoing cross-linkable monomer is preferably incompatible with the initially formed resin. Formation of such an incompatible polymer efficiently performs film formation on the resin particle surface and void formation between the film and the resin particle surface.

Specific examples of a hydrophobic cross-linkable monomer include divinylbenzene, divinylnaphthalene, trivinylbenzene 1,10-decanediol diacrylate, tricyclodecane dimethanol triacrylate, 1,6-hexanediol diacrylate, 1,6-hexanediol dimethacrylate, 1,9-nonanediol diacrylate, 1,9-nonanediol dimethacrylate, 2-methyl-1,8-octane diol dimethacrylate, tricyclodecane dimethanol dimethacrylate and trimethylolpropane trimethacrylate. Of these is preferred divinylbenzene.

A hydrophobic cross-linkable monomer is added preferably in an amount of from 0.1 to 50 parts by mass, based on 1 parts by mass of resin particles.

When adding the hydrophobic cross-linkable monomer, a monofunctional hydrophobic monomer may further be added thereto and allowed to copolymerize with the hydrophobic cross-linkable monomer.

Any monofunctional hydrophobic monomer which is capable of copolymerizing with the hydrophobic cross-linkable monomer and is similar to the foregoing hydrophobic monomer is usable in the invention. Specific examples of such a monofunctional hydrophobic monomer include styrene, α-methylstyrene, vinyltoluene, lauryl acrylate, lauryl methacrylate, 2-ethylhexyl acrylate, 2-ethylhexyl methacrylate, cyclohexyl acrylate, cyclohexyl methacrylate, benzyl acrylate, benzyl methacrylate, decyl acrylate, decyl methacrylate, palmityl acrylate, palmityl methacrylate, stearyl acrylate, behenyl acrylate, cetyl methacrylate, stearyl methacrylate, isoboronyl methacrylate, butadiene, and isoprene. Of these, styrene is preferred.

The content (or total amount) of an oil-soluble polymerization initiator relating to the invention is preferably from 0.1 to 20% by mass, and more preferably from 0.5 to 15% by mass. The oil-soluble polymerization initiator is one which initiates polymerization of a hydrophobic cross-linkable monomer and a monofunctional hydrophobic monomer. Accordingly, this polymerization initiator has to be oil-soluble one.

Specific examples of such an oil-soluble polymerization initiator include azo compounds such as azobisisobutyronitrile and peroxides such as qumene hydroperoxide, t-butyl hydroperoxide, diqumyl peroxide, di-t-butyl peroxide, benzoyl peroxide, and lauroyl peroxide, which are soluble in monomers. The content (or total amount) of an oil-soluble polymerization initiator is preferably from 0.1 to 20% by mass, and more preferably from 0.5 to 15% by mass, based on the total mass of a hydrophobic cross-linkable monomer and a monofunctional hydrophobic monomer, as described above.

A dispersion stabilizer is incorporated to enhance dispersibility of resin particles which have been swollen with a hydrophobic cross-linkable monomer and a monofunctional hydrophobic monomer. Examples of such a dispersion stabilizer include polymeric dispersion stabilizers such as polyvinyl alcohol, methyl cellulose, polyacrylic acid, polyacrylamide, polyethylene oxide and poly(hydroxystearic acid-g-methyl methacrylate-co-methacrylic acid), nonionic surfactants, anionic surfactants, amphoteric surfactants. Of these, polymeric dispersion stabilizers such as polyvinyl alcohol are preferred. The use of a polymeric dispersion stabilizer brings about superior results in the combination of an organic solvent and a hydrophilic solvent.

In the invention, an organic solvent may be used in polymerization of a hydrophobic monomer or hydrophobic cross-linkable monomer.

In the invention, an aqueous medium refers to a medium composed of 50-100% by mass of water and 0-50% by mass of a water-soluble organic solvent Examples of such a water-soluble organic solvent include methanol, ethanol, isopropanol, butanol, acetone and methyl ethyl ketone.

In the preparation method of hollow particles of the invention, an organic solvent [hereinafter, also denoted as organic solvent (X)] which is usable in the first polymerization step of a hydrophobic monomer is one which is dissolves the hydrophobic monomer but does not dissolve the formed resin. Examples of organic solvent (X) include lower alcohols such as methanol, ethanol or isopropanol; polyhydric alcohols such as ethylene glycol, propylene glycol, butanediol, diethylene glycol, or triethylene glycol; cellosolves such as methyl cellosolve or ethyl cellosolve; ketones such as acetone or methyl ethyl ketone; and hydrocarbons such as hexane. Such an organic solvent is appropriately determined in accordance with the kind of the hydrophobic monomer and the formed resin particles. Of these organic solvents, the use of lower alcohols such as ethanol is preferred in terms of superior dissolving capability for the hydrophobic monomer and being miscible with water at any ratio.

The organic solvent (X) may be used alone or in combination with water. In the invention, the use of water is preferred unless solubility of a hydrophobic monomer is adversely affected.

In the invention, an organic solvent may be used in polymerization of a cross-linkable monomer, as described above. Such a usable organic solvent [hereinafter, also denoted as organic solvent (Y)] is one which, is slightly water-soluble or water-insoluble and exhibits solubility in water of not more than 0.20 parts by mass per 100 parts by mass of water at 25° C.

This solvent (Y) dissolves or swells a resin formed of a hydrophobic monomer, a hydrophobic cross-linkable monomer and a monofunctional hydrophobic monomer, as described above and also contributes to void formation within the particle. Thus, a water-insoluble organic solvent is allowed to be contained within a hydrophobic particle and is removed in the step of washing and drying, whereby void formation within the particle is promoted. However, a residual organic solvent causes odor or bleed-out, so that when this solvent for use in polymerization of a cross-linkable monomer is preferably in an amount of not more than 1% by mass (more preferably not more than 0.1%) of total resin constituents.

Examples of such solvent (Y) include aromatic hydrocarbons such as toluene, xylene or benzene; esters such as ethyl acetate or butyl acetate; and aliphatic hydrocarbons such as hexane or heptane. Of these are aromatic hydrocarbon solvents such as toluene or xylene.

The outer diameter of hollow particles relating to the invention is preferably from 0.06 to 100 μm in volume-based median diameter ($D_{50}$).

The outer diameter of hollow particles is expressed in a volume-based median diameter ($D_{50}$), which is measured in the following manner.

Thus, the volume-based median diameter ($D_{50}$) can be measured and calculated using a Coulter Multisizer III (Beckmann Coulter Co.) which was connected to a computer system for data processing (Beckmann Coulter Co.), according to the following procedure.

To 20 ml of an aqueous surfactant solution (for example, a neutral detergent containing surfactant components is diluted to a factor of 10 with pure water) is added 0.02 g of a toner and dispersed with an ultrasonic homogenizer for 1 min. to prepare a toner dispersion. This toner dispersion is injected by a pipette into a beaker in which ISOTON II (Beckman Coulter Co.) within a sample stand has been placed until reaching a measurement concentration of 5% to 10%. This concentration range renders it feasible to obtain reproducible measurement values. Then, the measurement count is set to 2,500 and the measurement process is started. There is used 50 μm of the aperture diameter. The region of 1 to 30 μm is divided to 256 sites and their frequency values are calculated. A particle diameter corresponding 50% of a volume-based cumulative fraction from the larger side is defined as a volume-based median diameter ($D_{50}$).

EXAMPLES

The invention will be further described with reference to examples but is by no means limited to these.

Preparation of Resin Particle

Resin particles were prepared in the following manner.
Resin Particle (1)

A mixture solution of composition 1 containing styrene as a hydrophobic monomer was prepared and reacted at 70° C. for 8 hrs. in a reactor shown in FIG. 2 with stirring at 100 rpm under nitrogen gas influx, whereby resin particle (1) was prepared. The number average molecular weight of resin particle (1) was 54,000.
Composition 1

| Styrene | 100 parts by mass |
| Ethanol | 1000 parts by mass |
| Azobisisobutyronitrile | 2 parts by mass |
| Polyvinyl pyrrolidone | 10 parts by mass |
| n-Octylmercaptan | 0.7 parts by mass |

Resin Particle (2)

Resin particle (2) was prepared similarly the foregoing resin particle (1), provided that the amount of n-octylmercaptan was changed from 0.7 parts by weight to 1.6 parts by mass. The number average molecular weight of resin particle (2) was 23,000

Resin Particle (3)

Resin particle (3) was prepared similarly the foregoing resin particle (1), provided that the amount of n-octylmercaptan was changed from 0.7 parts by weight to 0.05 parts by mass. The number average molecular weight of resin particle (2) was 190,000.

Into a reactor of FIG. 2 were placed 8 parts by mass of sodium dodecylsulfate and 3000 parts by mass of deionized water and the internal temperature was raised to 80° C., while stirring at 230 rpm under a nitrogen gas stream. After completion of temperature raise, 10 parts by mass of potassium persulfate dissolved in 200 parts by mass of deionized water was added and the liquid temperature was again raised to 80° C. Subsequently, after dropwise adding a mixture solution of the following composition 4 over 1 hr., the reaction mixture was stirred with heating for 2 hr. to perform polymerization, whereby resin particle (4) was prepared. The number average molecular weight of resin particle (4) was 32,000.
Composition 4

| Styrene | 480 parts by mass |
| Butadiene | 250 parts by mass |
| n-Octylmercaptan | 1.1 parts by mass |

Resin Particle (5)

Resin particle (5) was prepared similarly the foregoing resin particle (1), provided that the amount of n-octylmercaptan was changed from 0.7 parts by weight to 6.1 parts by mass. The number average molecular weight of resin particle (5) was 7,500.

Resin Particle (6)

Resin particle (6) was prepared similarly the foregoing resin particle (4), provided that butadiene and n-octylmercaptan were not added. The number average molecular weight of resin particle (6) was 520,000.

Resin Particle (7)

Resin particle (7) was prepared similarly the foregoing resin particle (1), provided that styrene was replaced by methyl methacrylate and the amount of n-octylmercaptan was changed from 0.7 parts by weight to 0.4 parts by mass. The number average molecular weight of resin particle (7) was 69,000.

In Table 1 are shown hydrophobic monomer compounds used for preparation of resin particles, their addition amounts and the obtained resin particles.

TABLE 1

| Resin Particle No. | Hydrophobic Monomer (parts by mass) | Number Average Molecular Weight |
|---|---|---|
| 1 | Styrene (100) | 54,000 |
| 2 | Styrene (100) | 23,000 |
| 3 | Styrene (100) | 190,000 |
| 4 | Styrene + Butadiene (730) | 32,000 |
| 5 | Styrene (100) | 7,500 |
| 6 | Styrene (480) | 520,000 |
| 7 | Methyl methacrylate (100) | 69,000 |

The number average molecular weight is a value obtained by the method described earlier.

Preparation of Hollow Particle

Hollow particles were prepared in the manner described below.
Hollow Particle 1

Example 1

Dispersion 1 was prepared using resin particle (1) and divinylbenzene as a hydrophobic cross-linkable monomer, as below.
Dispersion 1

| Resin particle (1) | 1 part by mass |
| Deionized water | 100 parts by mass |
| Divinylbenzene | 5 parts by mass |

-continued

| Azobisisobutyronitrile | 0.5 parts by mass |
| Sodium laurylsulfate | 0.02 parts by mass |
| Polyvinyl alcohol | 0.15 parts by mass |

This dispersion 1 was placed into a reactor of FIG. 2 and stirred at 100 rpm for 2 hrs. under room temperature to allow divinylbenzene as a hydrophobic cross-linkable monomer to be absorbed in the resin particle (1). Subsequently, the temperature was raised to 70° C. and reaction was undergone for 8 hrs. A polymer obtained in the reaction was centrifugally separated and dried to obtain hollow particle 1. The volume-based median diameter ($D_{50}$) of the obtained hollow particles was 7.5 μm.

Hollow Particles 2-7, 10, 11, 13-15

Examples 2-7, Comparative Examples 1, 2, 4-6

Hollow particles 2-7, 10, 11 and 13-15 were prepare similarly to hollow particle 1, provided that resin particles and hydrophobic cross-linkable monomers are changed as shown in Table 2.

A large amount of divinylbenzene was used in excess for the preparation of hollow particle 15, so that aggregates were produced during polymerization and hollow particles were not formed.

Hollow Particle 8

Example 8

Hollow particle 8 was prepared similarly to the foregoing hollow particle 1, provided that the resin particle and the hydrophobic cross-linkable monomer were changed as shown in Table 2 and 1 part by mass of styrene was further added as a monofunctional hydrophobic monomer.

Hollow Particle 9

Example 9

Hollow particle 9 was prepared similarly to the foregoing hollow particle 1, provided that the resin particle and the hydrophobic cross-linkable monomer were changed as shown in Table 2 and $5\times10^{-3}$ parts by mass of xylene was further added as an organic solvent (Y).

There are shown in Table 2 resin particles, hydrophobic cross-linkable monomer compounds and their amounts and volume-base median diameters ($D_{50}$) as a particle size of the obtained hollow particles.

TABLE 2

| Example No. | Hollow Particle No. | Resin Particle No. | Hydrophobic Cross-linkable Monomer (parts by mass) | $D_{50}$ (μm) |
| --- | --- | --- | --- | --- |
| 1 | 1 | 1 | DVB*[1] (5) | 7.5 |
| 2 | 2 | 2 | DVB (10) | 7 |
| 3 | 3 | 3 | DVB (2) | 5.2 |
| 4 | 4 | 4 | DVB (5) | 0.3 |
| 5 | 5 | 1 | DVB (30) | 8.4 |
| 6 | 6 | 1 | DVB (0.5) | 7.2 |
| 7 | 7 | 1 | TVB*[2] (5) | 7.5 |
| 8 | 8 | 1 | DVB (4) | 7.4 |
| 9 | 9 | 1 | DVB (5) | 8.5 |
| 10 | 16 | 1 | DVB (5) | 9.8 |
| Comp. 1 | 10 | 5 | DVB (5) | 5.3 |
| Comp. 2 | 11 | 6 | DVB (5) | 0.2 |
| Comp. 3 | 12 | 7 | DVB (5) | 8.9 |
| Comp. 4 | 13 | 1 | TEG*[3] (5) | 8 |
| Comp. 5 | 14 | 1 | DVB (0.05) | 7 |
| Comp. 6 | 15 | 1 | DVB (100) | — |

*[1]DVB: divinylbenzene,
*[2]TVB: trivinylbenzene
*[3]TEG: triethylene glycol diacrylate The volume-based median diameter ($D_{50}$) was determined by the method described earlier.

Hollow Particle 12

Comparative Example 3

Hollow particle 12 was prepared similarly to the foregoing hollow particle 1, provided that the resin particle, the hydrophobic cross-linkable monomer and its amount were changed as shown in Table 2 and $5\times10^{-3}$ parts by mass of xylene was further added as an organic solvent (Y).

Hollow Particle 16

Example 10

Hollow particle 16 was prepared similarly to the foregoing hollow particle 1, provided that the resin particle, the hydrophobic cross-linkable monomer and its amount were changed as shown in Table 2 and 0.6 parts by mass of xylene was further added as an organic solvent (Y).

Hollow Particle 17

Comparative Example 7

The following solution was added to a reactor shown in FIG. 2 and raised to a temperature pf 78° C.

| Deionized water | 2900 parts by mass |
| Sodium dodecylbenzenesulfonate | 2.0 parts by mass |
| Subsequently, a monomer emulsion of the following composition was prepared. | |
| Deionized water | 266 parts by mass |
| Sodium dodecylbenzenesulfonate | 0.4 parts by mass |
| Butyl acrylate | 416 parts by mass |
| Methyl methacrylate | 374 parts by mass |
| Methacrylic acid | 10.4 parts by mass |

Into the reactor was added 50 parts by mass of the foregoing emulsion and then, 3 parts by mass of ammonium persulfate dissolved in 10 parts by mass was added thereto. After 15 min., addition of the residual monomer emulsion was started at a rate of 16 g/min and the temperature was raised to 85° C. The reaction mixture was cooled to 55° C. after 15 min. of completing monomer addition, and thereto were added 1 part by mass of t-butyl peroxide (70% by mass) and 20 parts by mass of sodium sulfoxylate formaldehyde dissolved in 20 parts by mass of water. Further thereto, 28% ammonia water was added at 25° C. and the product was filtered to obtain a resin dispersion. The solid content of the obtained resin was 19.5% by mass.

Subsequently, seed polymerization was performed. Into a reactor, as shown in FIG. 2, provided with a stirrer, a thermometer, a nitrogen inlet and a reflux condenser was added 2115 parts by mass of deionized water and heated to 84° C. and thereto, 4.2 parts by mass of sodium persulfate dissolved in 25 parts by mass of water was added. Subsequently, 62 parts by mass of the foregoing resin dispersion was added thereto and dispersed. Further, a monomer emulsion having the following composition was added at 85° C. over 3 hrs. After 25 min., the reaction mixture was cooled to 25° C. and filtered to remove coagulated materials, whereby a resin dispersion was obtained.

| Deionized water | 235 parts by mass |
| --- | --- |
| Sodium dodecylbenzenesulfonate | 0.8 parts by mass |
| Ethylene glycol diacrylate | 3.5 parts by mass |
| Methyl methacrylate | 490 parts by mass |
| Methacrylic acid | 210 parts by mass |

Subsequently, 0.7 parts by mass of sodium persulfate was added to 800 parts by mass of 85° C. deionized water and then, 45 parts by mass of the foregoing resin dispersion was added. Further thereto, 180 parts by mass of methyl methacrylate was added over 1 hr., maintained at 85° C. over 3 hr. and then cooled to obtain a resin dispersion.

The resin dispersion was subjected to an alkali treatment. The resin dispersion was neutralized with an equivalent amount of ammonium hydroxide, heated to 95° C., maintained for 1 hr. and cooled to room temperature. The resin dispersion was washed by centrifugal separation and dried to obtain hollow particle 17. The volume-based median diameter ($D_{50}$) of the obtained hollow particle 17, which was measured by the method described earlier, was 1.2 µm.
Hollow Particle 18

Comparative Example 8

Resin particle (5) of 10 parts by mass was added to a mixture solution of 90 parts by mass of methyl methacrylate, 10 parts by mass of divinylbenzene and 3 parts by mass of benzoyl peroxide and dispersed. To this solution was added an aqueous solution of 10 parts by mass of polyvinyl alcohol dissolved in 800 parts by mass of water and polymerization was performed at 80° C. for 4 hrs. with stirring at 150 rpm. The obtained polymer was washed through centrifugal separation and dried to obtain hollow particle 18. The volume-based median diameter ($D_{50}$) of the obtained hollow particle 18, which was measured by the method described earlier, was 4.3 µm.
Hollow Particle 19

Comparative Example 9

To 15 parts by mass of an aqueous solution obtained by dissolving 0.05 parts by mass of polyvinyl alcohol (polymerization degree of 1700, saponification degree of 88%) in water were added 0.25 parts by mass of divinylbenzene, 0.005 parts by mass of benzoyl peroxide and 0.25 parts by mass of hexadecane and homogeneously suspended to obtain a suspension. Suspending was conducted by using a homogenizer at 1000 rpm under room temperature.

Subsequently, the suspension was heated at 70° C. with stirring under a nitrogen gas atmosphere to perform suspension polymerization. The thus obtained dispersion was filtered with filter paper to separate hollow particles and the separated hollow particles were dried at a temperature of 70° C. under a pressure of 100000 Pa (under atmospheric pressure) to obtain hollow particle 19. The volume-based median diameter ($D_{50}$) of the obtained hollow particle 19, which was measured by the method described earlier, was 10 µm.

Evaluation

The thus prepared hollow particles 1-19 (Examples 1-10 and Comparative Examples 1-9) were each evaluated with respect to the following characteristics.
Void of Hollow Particle The void of hollow particles was evaluated in the following manner. Hollow particles were embedded into a photocurable resin and sliced to prepare a ca. 100 nm thick ultra-slice. Using the slice, 50 hollow particles, selected at random, were observed with a transmission electron microscope (2000 FX, produced Nippon Denshi Co.) and evaluated based on the number of particles having voids, according to the following criteria:
  A: of the 50 particles, at least 48 particles had at least one void,
  B: 45-47 particles had at least one void,
  C: at least 6 particle had no void,
wherein grades A and B were acceptable in practice, while grade C was unacceptable.
Moisture Absorption Under High Humidity The rate of moisture absorption was measured in the manner that hollow particles were allowed to stand under high temperature and high humidity (30° C., 80% RH) for 24 hr. and the moisture content of the particles was measured according to the procedure described below.

Measurement was conducted by the Karl Fischer coulometric titration method. Specifically, using an automatic heat vaporization moisture measurement system (AQS-724, produced by Hiranuma Sangyo Co., Ltd.), approximately 0.5 g of hollow particles which were allowed to stand for 24 hr. at 30° C. and 80% RH were precisely weighed and placed into a 20 ml glass tube and tightly stoppered with a fluororesin-coated silicone rubber packing. To make correction of moisture existing in the tightly stoppered environment, two empty sample tubes were simultaneously measured. Measurement was conducted for 1 min. under the conditions of 110° C. and a carrier gas (nitrogen) flow rate of 150 ml/min. There were used Hydranal Aqualite RS (produced by Riedel de Haen Co.) and Aqualite C (produced by Kanto Kagaku Co.) as a reagent.

The rate of moisture absorption of hollow particles was calculated according to the following equation:

$$\text{Rate of moisture absorption (\%)} = [\text{detected moisture content (g)/mass of weighed particles (g)}] \times 100$$

Moisture absorption was evaluated based on the following criteria:
  A: a moisture absorption rate of less than 0.6% by mass,
  B: a moisture absorption rate of not less than 0.6% by mass and less than 1.2% by mass,
  C: a moisture absorption rate of not less than 1.2% by mass
wherein grades A and B are acceptable in practice and grade C is unacceptable.
Odor Evaluation of odor was conducted in the manner that 1 g of hollow particles was placed on a sheet of aluminum foil, covered with a 50 ml beaker and heated on a hot plate at 100° C. for 30 min., then, then the beaker was taken out and the interior of the beaker was smelled. Odor was evaluated based on the following criteria, in which ranks 1 and 2 were acceptable in practice and rank 3 was unacceptable in practice:
  Rank 1: there was almost no odor,
  Rank 2: there was a slight odor,
  Rank 3: there was definitely recognized an odor.

Evaluation results are shown in Table 3.

TABLE 3

| Example No. | Hollow Particle No. | Void | Rate of Moisture Absorption | Odor |
| --- | --- | --- | --- | --- |
| 1 | 1 | A | A | 1 |
| 2 | 2 | B | A | 1 |
| 3 | 3 | A | B | 1 |
| 4 | 4 | B | B | 1 |
| 5 | 5 | A | A | 1 |
| 6 | 6 | B | A | 1 |
| 7 | 7 | A | A | 1 |
| 8 | 8 | A | A | 1 |
| 9 | 9 | A | A | 2 |
| 10 | 16 | A | B | 2 |
| Comp. 1 | 10 | C | A | 1 |
| Comp. 2 | 11 | C | A | 1 |
| Comp. 3 | 12 | B | C | 2 |
| Comp. 4 | 13 | A | C | 1 |
| Comp. 5 | 14 | C | B | 1 |
| Comp. 6 | 15 | — | — | — |
| Comp. 7 | 17 | A | C | 2 |
| Comp. 8 | 18 | A | C | 2 |
| Comp. 9 | 19 | A | B | 3 |

As is apparent from the results of Table 3, it was proved that hollow particles 1-9 and 16 exhibited superior results in hollow particle voids, moisture absorption under a high humidity environment and reduced odor. On the contrary, hollow particles 10-15 and 17-19 exhibited problems in at least one of evaluation items.

What is claimed is:

1. Method of preparing hollow particles comprising the steps of:
   (a) polymerizing a hydrophobic monomer (1) to form a particulate resin exhibiting a number average molecular weight of from 20,000 to 500,000,
   (b) dispersing the particulate resin in an aqueous medium to form a resin particle dispersion and adding to the dispersion a hydrophobic cross-linkable monomer (2) in an amount of from 0.1 to 50 parts by mass based on 1 part by mass of the particulate resin, and
   (c) polymerizing the cross-linkable monomer (2) to form hollow particles.

2. The method of claim 1, wherein the particulate resin exhibits a number average molecular weight of from 40,000 to 100,000.

3. The method of claim 1, wherein the hydrophobic monomer (1) is at least one selected from the group consisting of styrene, α-methylstyrene, vinyltoluene, lauryl acrylate, lauryl methacrylate, 2-ethylhexyl acrylate, 2-ethylhexyl methacrylate, cyclohexyl acrylate, cyclohexyl methacrylate, benzyl acrylate, benzyl methacrylate, decyl acrylate, decyl methacrylate, palmityl acrylate, palmityl methacrylate, stearyl acrylate, behenyl acrylate, cetyl methacrylate, stearyl methacrylate, isoboronyl methacrylate, butadiene and isoprene.

4. The method of claim 3, wherein the hydrophobic monomer (1) is styrene.

5. The method of claim 1, wherein the hydrophobic cross-linkable monomer (2) is at least one selected from the group consisting of divinylbenzene, divinylnaphthalene, trivinylbenzene, 1,10-decanediol diacrylate, tricyclodecane dimethanol triacrylate, 1,6-hexanediol diacrylate, 1,6-hexanediol dimethacrylate, 1,9-nonanediol diacrylate, 1,9-nonanediol dimethacrylate, 2-methyl-1,8-octanediol dimethacrylate, tricyclodecane dimethanol dimethacrylate and trimethylolpropane trimethacrylate.

6. The method of claim 5, wherein the hydrophobic cross-linkable monomer (2) is divinylbenzene.

7. The method of claim 1, wherein the hollow particles exhibit a volume-based median diameter ($D_{50}$) of from 0.06 to 100 µm.

8. The method of claim 1, wherein the hollow particles exhibit a void ratio of from 10 to 70%.

9. The method of claim 1, wherein in step (b), the hydrophobic cross-linkable monomer (2) is added in an amount of 0.1 to 50 parts by mass based on 1 part by mass of the particulate resin and a polymerization initiator and a dispersion stabilizer are further added to the dispersion.

10. The method of claim 9, wherein a water-insoluble organic solvent is further added to the dispersion.

11. The method of claim 1, wherein in step (b), a monofunctional hydrophobic monomer (3) is further added to the dispersion to be allowed to copolymerize with the hydrophobic cross-linkable monomer (2) in step (c).

12. The method of claim 11, wherein the monofunctional hydrophobic monomer (3) is at least one selected from the group consisting of styrene, α-methylstyrene, vinyltoluene, lauryl acrylate, lauryl methacrylate, 2-ethylhexyl acrylate, 2-ethylhexyl methacrylate, cyclohexyl acrylate, cyclohexyl methacrylate, benzyl acrylate, benzyl methacrylate, decyl acrylate, decyl methacrylate, palmityl acrylate, palmityl methacrylate, stearyl acrylate, behenyl acrylate, cetyl methacrylate, stearyl methacrylate, isoboronyl methacrylate, butadiene and isoprene.

13. The method of claim 1, wherein the method further comprises the steps of:
   (d) washing the formed hollow particles, and
   (e) drying the washed hollow particles.

14. The method of claim 1, wherein in step (b), the hydrophobic cross-linkable monomer (2) is added alone as a polymerizable monomer.

* * * * *